US006591035B2

(12) United States Patent
Miller et al.

(10) Patent No.: US 6,591,035 B2
(45) Date of Patent: Jul. 8, 2003

(54) METHOD FOR DISPERSING LIGHT USING MULTILAYERED STRUCTURES

(75) Inventors: David A. B. Miller, Stanford, CA (US); Martina Gerken, Mountain View, CA (US); Bianca E. Nelson, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 40 days.

(21) Appl. No.: 09/778,327

(22) Filed: Feb. 6, 2001

(65) Prior Publication Data

US 2002/0018298 A1 Feb. 14, 2002

Related U.S. Application Data

(60) Provisional application No. 60/211,632, filed on Jun. 14, 2000, and provisional application No. 60/201,323, filed on May 2, 2000.

(51) Int. Cl.[7] .................................................. G02B 6/28
(52) U.S. Cl. .............................. 385/24; 385/31; 385/36; 385/37; 359/115
(58) Field of Search .............................. 385/24, 31, 36, 385/37; 359/586, 138, 115

(56) References Cited

U.S. PATENT DOCUMENTS

| | | | |
|---|---|---|---|
| 4,284,323 A | 8/1981 | Jankowitz | ................... 350/1.6 |
| 4,770,496 A | 9/1988 | Mahlein | ..................... 350/166 |
| 4,773,063 A | 9/1988 | Hunsperger et al. | ........... 370/3 |

(List continued on next page.)

OTHER PUBLICATIONS

Nelson et al, Use of a dielectric stack as a one–dimensional photonic crystal for wavelength demultiplexing by beam splitting, Oct. 15, 2000, Optics Letters, vol. 25, No. 20, pp. 1502–1504.*

(List continued on next page.)

Primary Examiner—Rodney Bovernick
Assistant Examiner—Sung Pak
(74) Attorney, Agent, or Firm—Lumen Intellectual Property Services, Inc.

(57) ABSTRACT

A novel method and device for separating light of differing wavelengths (wavelength demultiplexing) uses a very simple and compact multilayer dielectric structure having high angular dispersion at certain wavelengths and angles of incidence. The structure is composed of alternating layers of dielectric materials of different refractive indices, and is designed to operate just outside the main reflection region rather than within the main reflection region. In this region just outside the main reflection region there is strong group velocity dispersion, causing different wavelengths of light to travel at different angles through the dielectric stack. As a consequence, different wavelength components of a polychromatic beam are separated as they pass through the device. The dielectric stack is preferably fabricated upon one or both sides of a transparent substrate so that the device can operate with light entering and/or exiting the substrate, eliminating the need for complicated antireflective coatings interfaced with the stack. Preferably, the device also comprises anti-reflective and reflective coatings to attain high optical efficiency and to increase spatial separation of the wavelengths of light, further reducing the size of the device. The device can also operate as a multiplexer by simply reversing the direction of the light. The device may be used for optical demultiplexing a polychromatic beam into spatially separated wavelength component beams by coupling the polychromatic beam into the multilayer dielectric stack, separating the polychromatic beam into component beams having distinct component wavelengths as the polychromatic beam passes through the multilayer dielectric stack, and coupling the component beams out of the multilayer dielectric stack. By reflecting the component beams from one or more mirrors in contact with the multilayer dielectric stack and/or substrate, further separation of the component beams may be produced as the component beams again pass through the multilayer dielectric stack. The method may also include transmitting the component beams and/or the polychromatic beam through antireflective material layers in contact with the multilayer dielectric stack and/or the substrate.

18 Claims, 9 Drawing Sheets

U.S. PATENT DOCUMENTS

| | | | |
|---|---|---|---|
| 5,740,287 A | 4/1998 | Scalora et al. | 385/6 |
| 5,835,273 A | 11/1998 | Ida et al. | 359/584 |
| 5,835,517 A | 11/1998 | Jayaraman et al. | 372/50 |
| 6,122,417 A * | 9/2000 | Jayaraman et al. | 372/50 |
| 6,147,806 A * | 11/2000 | Park et al. | 359/247 |
| 6,320,996 B1 * | 11/2001 | Scobey et al. | 359/128 |
| 6,396,617 B1 * | 5/2002 | Scalora | 359/248 |
| 6,404,947 B1 * | 6/2002 | Matsuda | 359/115 |

OTHER PUBLICATIONS

Kosaka et al. "Superprism phenomena in photonic crystals," Phys. Rev. B, vol. 58, No. 16, Oct. 15, 1998.

Kosaka et al. "Self–collimating phenomena in photonic crystals," Appl. Phys. Lett., vol. 74, No. 9, Mar. 1, 1999.

Kosaka et al. "Photonic crystals for micro–lightwave circuits using wavelength–dependent angular beam steering," Appl. Phys. Lett., vol. 74, No. 10, Mar. 8, 1999.

* cited by examiner

METHOD FOR DISPERSING LIGHT USING MULTILAYERED STRUCTURES

CROSS-REFERENCE TO RELATED APPLICATIONS

This application claims priority from U.S. Provisional Patient Applications 60/201,323 filed May 2, 2000, and 60/211,632 filed Jun. 14, 2000, both of which are herein incorporated by reference.

STATEMENT REGARDING FEDERALLY SPONSORED RESEARCH OR DEVELOPMENT

This invention was supported in part by grant number F49620-97-1-0517 of the Air Force Office of Scientific Research and Defense Advanced Research Projects Agency (DARPA). The U.S. Government may have certain rights in the invention.

FIELD OF THE INVENTION

This invention relates generally to methods and devices for optical wavelength multiplexing and demultiplexing. More particularly, it relates to improved methods and devices for spatially separating and/or combining component wavelength beams in wavelength-division multiplexing optical communication.

BACKGROUND ART

In optical communications the technique of wavelength-division multiplexing (WDM) allows several different signals to be transmitted through a single optical fiber using a different wavelength for each signal. Implementation of WDM requires multiplexing techniques that spatially superimpose the different monochromatic beams prior to transmission, and demultiplexing techniques that spatially separate the different wavelength components of the polychromatic beam after transmission to recover the original monochromatic beams.

Demultiplexing requires a technique for dispersing or spatially separating light based on its wavelength. In optical communications applications, demultiplexing is often performed using conventional prisms or diffraction gratings to select and separate different wavelengths of light. These conventional devices, however, have small dispersion (change in propagation angle with respect to wavelength) and must consequently be quite large in order to achieve sufficient separation of the wavelengths. Smaller, integrated waveguide grating routers have been developed, but these integrated devices also suffer from relatively small effective angular deflection. As a result, these integrated devices must also be made relatively large. The gratings in these devices also make them complicated and expensive to fabricate. Demultiplexing is also performed using collections of cascaded thin-film filters, but these devices require many filters and are also complicated and expensive. Recently, Kosaka et al. ("Superprism phenomena in photonic crystals," Phys. Rev. B, Vol. 58, No. 16, Oct. 15, 1998; "Self-collimating phenomena in photonic crystals," Appl. Phys. Lett., Vol. 74, No. 9, Mar. 1, 1999; "Photonic crystals for micro-lightwave circuits using wavelength-dependent angular beam steering," Appl. Phys. Lett., Vol. 74, No. 10, Mar. 8, 1999) have proposed a method based on photonic crystals that can give angular dispersion many times larger than a prism or diffraction grating. Although the structures proposed by Kosaka et al. are much more compact than prior devices, their fabrication is expensive and complex.

Because the rapidly developing optical communications industry has a need for ever-smaller and inexpensive components, the above demultiplexing techniques and devices are inadequate for current and future demands. What is needed is a demultiplexing device that is both very compact and easily fabricated.

SUMMARY

The present inventors have discovered a novel technique for separating light of differing wavelengths using a very simple and compact device. The inventors have discovered that certain simple integrated structures have high angular dispersion (i.e., exhibit the "superprism effect") at certain wavelengths and angles of incidence, and that these simple structures can therefore be used for optical demultiplexing. In one aspect of the present invention, a novel optical demultiplexing device comprises a compact integrated multilayered dielectric structure containing alternating layers of materials of different refractive indices. The multilayered stack of dielectric layers is comparable in structure to dielectric stacks used as mirrors, but is designed to operate just outside the main reflection region of the spectrum, rather than within the main reflection region as is normally the case. In this region just outside the main reflection region, there is strong group velocity dispersion, causing different wavelengths of light to travel at different angles through the dielectric stack. As a consequence, this property can be exploited to obtain a large beam-steering effect in the stack for wavelengths near the main reflection band edge.

The alternating layers of dielectric material can have periodic or non-periodic thicknesses. The device can be easily and inexpensively manufactured using well-known techniques, e.g., semiconductor epitaxial growth techniques, and techniques for fabricating dielectric thin film optical filters. The dielectric stack is preferably fabricated upon one or both sides of a transparent substrate so that the device can operate with light entering and/or exiting the substrate, eliminating the need for complicated antireflective coatings interfaced with the stack. Preferably, the device also comprises anti-reflective and reflective coatings to attain high optical efficiency and to increase spatial separation of the wavelengths of light, further reducing the size of the device. Because of the inherent scalability, the devices of the present invention can be designed to operate at any wavelength range of interest. Due to its inherent symmetry, in addition to operating as a demultiplexer, the device can also operate as a multiplexer. The present invention, therefore, exploits highly dispersive properties of multilayer dielectric stacks to provide a novel type of demultiplexer/multiplexer for WDM that is very compact, inexpensive to fabricate, and made from readily available materials.

In one aspect of the present invention, a solid-state optical wavelength division multiplexing-demultiplexing device is provided which comprises a multilayer dielectric stack which is typically fabricated on a substrate. The substrate may be partly or entirely detached from the stack, or the substrate may be left in place as part of the device. In some embodiments, the substrate material is transparent to light within a predetermined operating range of wavelengths, and is an optically functional part of the device. In other embodiments, the substrate simply provides mechanical support for the device. The multilayer dielectric stack has a substantially nonzero group velocity dispersion for a range of angles of incidence of light within a predetermined operating range of wavelengths just outside of a main reflection band edge of the stack. Consequently, the stack has substantially nonzero angular dispersions in the predetermined operating range of wavelengths. This property is preferably sufficient to ensure angular dispersions of the stack greater than 2 degrees per nm within 5 nm of the main reflection band edge. The multilayer dielectric stack may have a periodic or non-periodic structure. The stack may have a full photonic band gap, or it may have a photonic band gap for only a limited range of angles of incidence of light within the predetermined operating range of wavelengths. The multilayer dielectric stack may be composed of alternating layers of various common dielectric materials commonly used in the production of thin film dielectric stacks, as well as other dielectric materials. For example, the alternating layers may be composed of GaAs and AlGaAs grown on a GaAs substrate. Or the stack may be composed of alternating layers of GaAlAs and Al oxide grown on a GaAs substrate.

Some embodiments of the present invention may comprise one or more antireflective coatings and/or mirrors fabricated on the multilayer dielectric stack, on the substrate, or on both. Mirrors may be fabricated at the interface between the stack and substrate, as well as on the outside surfaces of the stack and/or substrate. In some embodiments of the device, two dielectric stacks are fabricated on opposing sides of the substrate, forming a device with a substrate sandwiched between two stacks.

In another aspect of the invention a method is provided for optical demultiplexing a polychromatic beam into spatially separated wavelength component beams. The method comprises coupling the polychromatic beam into a multilayer dielectric stack, separating the polychromatic beam into component beams having distinct component wavelengths as the polychromatic beam passes through the multilayer dielectric stack, and coupling the component beams out of the multilayer dielectric stack. The multilayer dielectric stack has a substantially nonzero group velocity dispersion within a predetermined operating range of wavelengths, and the distinct component wavelengths of the component beams are contained within the predetermined wavelength range. This property ensures that the wavelength components separate as they pass through the stack. The stack may have a periodic or non-periodic structure, and the operating range of wavelengths is preferably just outside a main reflection region, or photonic crystal band, of the stack. In some embodiments, the method also includes reflecting the component beams from a mirror in contact with the multilayer dielectric stack, and further separating the component beams as the component beams again pass through the multilayer dielectric stack. The method may also include transmitting the component beams and/or the polychromatic beam through antireflective material layers in contact with the multilayer dielectric stack. The method may also include transmitting the component beams and/or the polychromatic beam through an antireflective material layer in contact with a substrate material, and transmitting the component beams and/or the polychromatic beam through the substrate material, wherein the substrate material is in contact with the multilayer dielectric stack. The component beams and/or the polychromatic beam may also be reflected from a mirror in contact with the substrate material.

BRIEF DESCRIPTION OF THE DRAWING FIGURES

DETAILED DESCRIPTION

Figure 1:
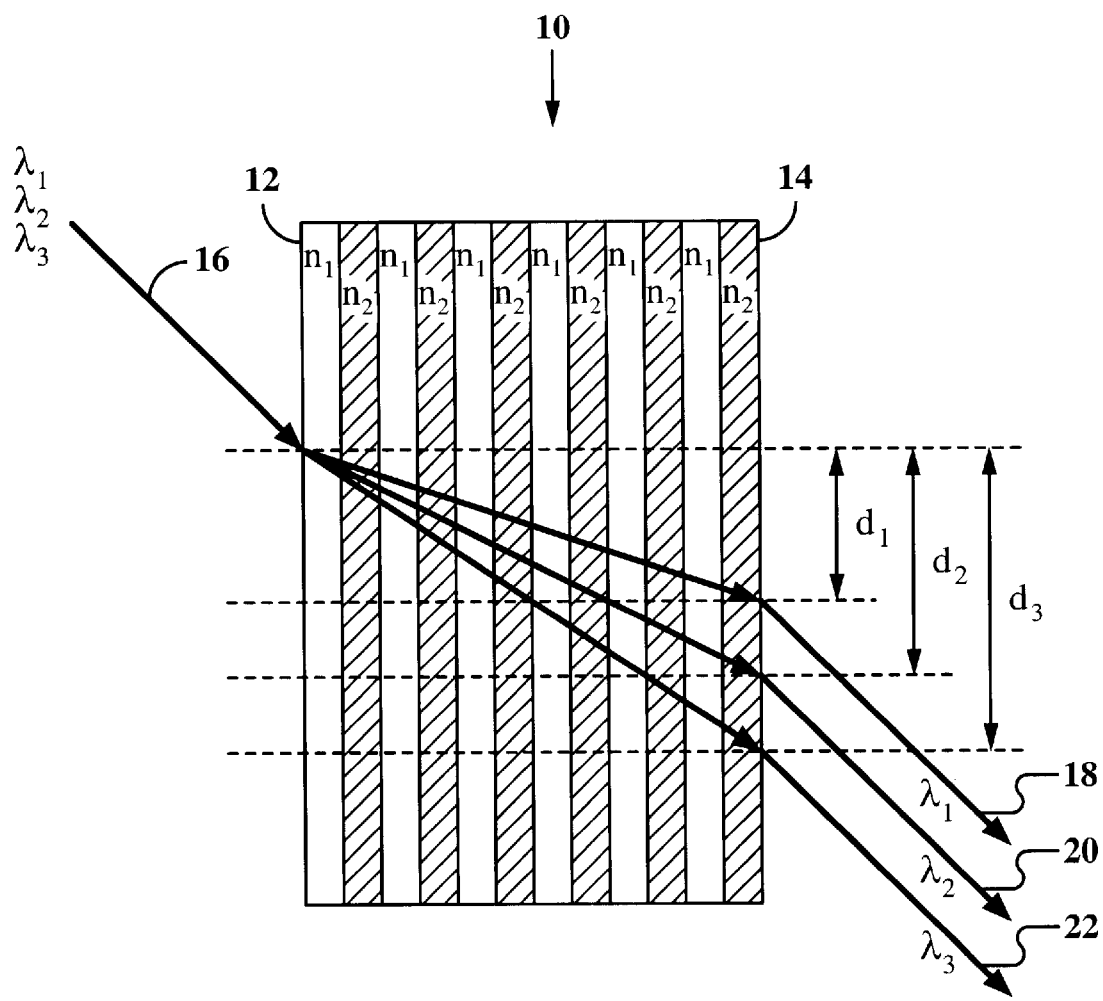
FIG. 1 is a cross-sectional view of a dielectric stack optical wavelength demultiplexer that separates a polychromatic beam into its distinct wavelength components, according to an embodiment of the present invention.

Specific embodiments of the present invention will now be described with reference to the drawing figures. FIG. 1 is a cross-sectional view of a dielectric stack 10 according to one embodiment of the present invention. The dielectric stack comprises alternating layers of a first dielectric material 12 having a refractive index $n_1$, and a second dielectric material 14 having a refractive index $n_2$ distinct from $n_1$.

As is well known, many different materials are suitable for making multilayer dielectric structures. For example, GaAs ($n_1$=3.6) and AlGaAs ($n_2$=3.0) can be used as first and second dielectric materials, grown on a GaAs substrate. In addition to the more common dielectric materials used in multilayer structures, it is also possible to use GaAlAs and Al oxide as the high and low index materials, because the aluminum oxide can be formed effectively by the oxidation of AlAs. Moreover, AlAs and GaAlAs can be grown effectively using modern semiconductor growth techniques such as molecular beam epitaxy or metal organic chemical vapor deposition, allowing such structures to be integrated with other semiconductor optical, electronic, or optoelectronic devices during the same processing.

For clarity of illustration, stack 10 in FIG. 1 is shown with just a few layers. In fact there may be 30 layers or more, with a total stack thickness typically on the order of several microns. In general, the thickness of the stack is selected so that the total path of the light through the stack is sufficient to spatially separate the component wavelengths. In the simplest design of stack 10, all layers of same material have similar thickness, typically on the order of 100 nm. In contrast to a Bragg reflector, which must have such a periodic structure in order to function as intended, the stack 10 need not have layers with periodic thicknesses. The layers may have non-periodic thicknesses as well. The key design criterion is that there preferably be a substantially non-zero group velocity dispersion in the wavelength region of operation. That is, the variation in phase of a beam as it passes through the stack should have a substantially non-linear dependence upon its frequency. Preferably, the group velocity dispersion is strong. Such variation can be achieved in many different forms of dielectric structures, as will be appreciated and understood by those skilled in the art in view of the teachings of the present invention. Accordingly, the dielectric stacks used in the present invention are not limited to the various specific structures explicitly illustrated. Preferably, devices according to the present invention have a strong group velocity dispersion, with a propagation angle inside the structure that depends strongly on the free-space wavelength, i.e., an angular dispersion of greater than 2 degrees per nm change of free-space wavelength within 5 nm wavelength of a main reflection region, and greater than 10 degrees per nm within 1 nm of the main reflection region. Thus, it is preferable to operate the device with wavelengths very close to the edge of the main reflection band in order to maximize the separation of the wavelength components. Devices with smaller, but substantially non-zero dispersions are also within the scope of the present invention. Preferably, the angular dispersion is at least 0.2 degree per nm within 5 nm of the main reflection region, and at least 1 degree per nm within 1 nm of the main reflection region. In addition, it should be noted that, because the device light passes through the stack only within a certain range of angles, a main reflection band gap at all angles of incidence is not a necessary property of the device. The main reflection region is understood in the present context to be a region of substantial reflection, and for the largest angular dispersions, such a main reflection region is preferably a region of substantially complete reflection, where substantially complete reflection is understood to mean reflectivity of at least 90%, or preferably at least 95%, or more preferably at least 98%, or most preferably at least 99%. In case of a purely periodic structure, it will be noted that the main reflection region corresponds to the photonic crystal band gap. It should be understood that such substantially complete reflection is not essential for the operation of the device, but is merely a preferred condition for operation with the largest angular dispersion.

The stack 10 is shown in FIG. 1 in its use as a demultiplexer. A polychromatic beam 16 enters one side of the stack at an angle. Due to the group velocity dispersion in the stack, the polychromatic beam is separated into several separate wavelength component beams 18, 20, 22. The figure illustrates a simple case where the polychromatic beam comprises three wavelengths, $\lambda_1, \lambda_2, \lambda_3$, which are separated into the three beams, 18, 20, 22, respectively. The device is designed so that the wavelengths $\lambda_1, \lambda_2, \lambda_3$ are all just outside the main reflection region of the stack. As the beams 18, 20, 22 pass through stack 10, they are spatially shifted by differing distances, $d_1, d_2, d_3$, as shown. The original beam is thus demultiplexed by this simple and compact dielectric stack 10.

Figure 2:
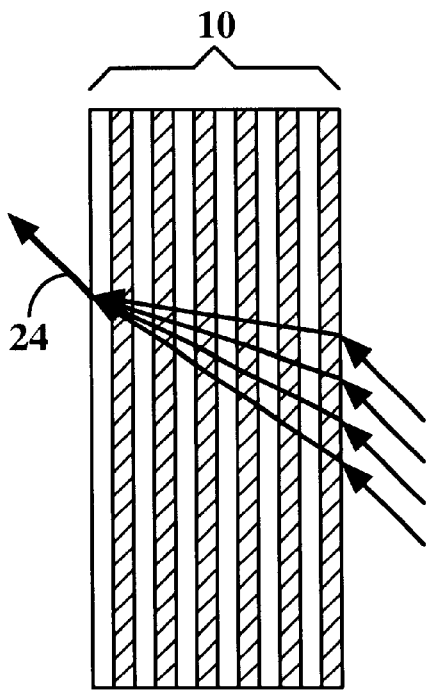
FIG. 2 is a cross-sectional view of the dielectric stack shown in FIG. 1, illustrating how, by reversing the directions of the light beams shown in FIG. 1, the same stack functions instead as a multiplexer, combining several beams of differing wavelengths into one polychromatic beam.
Figure 3:
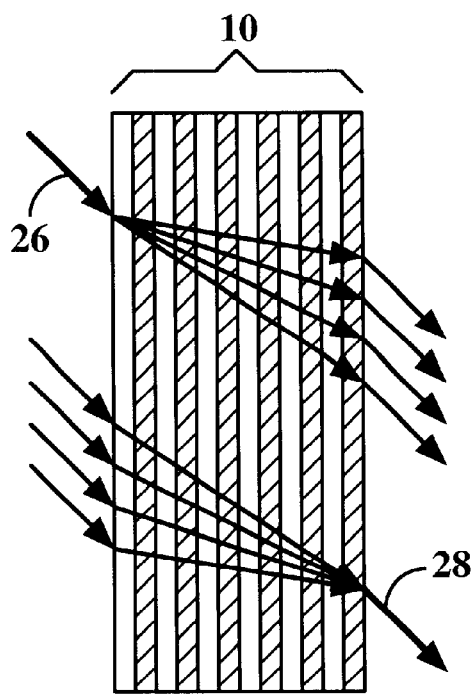
FIG. 3 is a cross-sectional view of the dielectric stack shown in FIG. 1, illustrating how the same stack can function simultaneously as both a multiplexer and demultiplexer.
Figure 4:
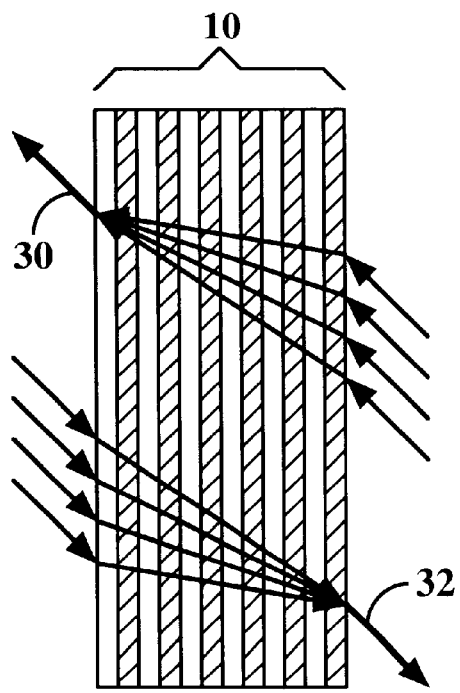
FIG. 4 is a cross-sectional view of the dielectric stack shown in FIG. 1, illustrating how the stack can function as a multiple multiplexer, producing two multiplexed beams from their respective sets of component wavelength beams.
Figure 5:
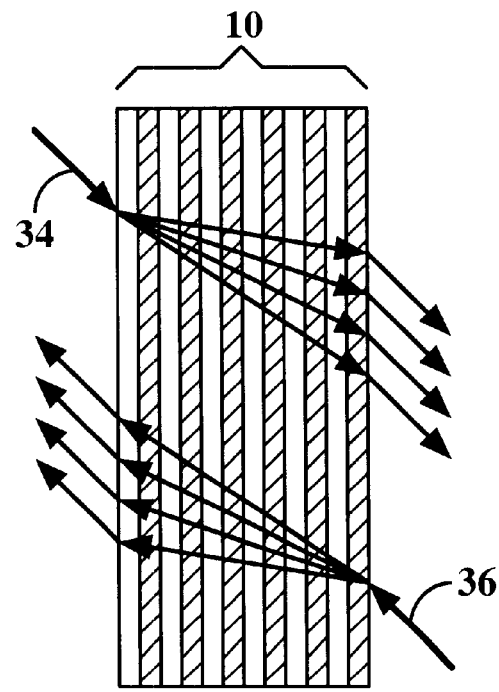
FIG. 5 is a cross-sectional view of the dielectric stack shown in FIG. 1, illustrating how the stack can function as a multiple demultiplexer, simultaneously separating each of two polychromatic beams into its respective component wavelengths.

Although FIG. 1 shows a polychromatic beam separated into three wavelength component beams, it is clear that any number of distinct wavelength components may be present in the polychromatic beam (e.g., FIGS. 4–7 show the case of four component beams). It will also be appreciated by those skilled in the art that, by reversing the directions of the light beams shown in FIG. 1, the same stack functions instead as a multiplexer, combining several beams of differing wavelengths into one polychromatic beam 24, as shown in FIG. 2. Consequently, the demultiplexing devices of the present invention may be used for both multiplexing and demultiplexing. Because the principles of demultiplexers apply equally to multiplexers by simply reversing the direction of the light beams, the present description will refer to both devices simply as demultiplexers, without loss of generality. Moreover, the same stack can function simultaneously as both a multiplexer and demultiplexer, as shown in FIG. 3, simultaneously demultiplexing a polychromatic beam 26 into its component wavelengths, and multiplexing several component wavelength beams into a single polychromatic beam 28. In addition, the stack 10 can function as a multiple multiplexer, producing two multiplexed beams 30 and 32 from their respective sets of component wavelength beams, as shown in FIG. 4. Similarly, the stack 10 can act as a multiple demultiplexer, demultiplexing beams 34 and 36 into their component wavelength beams, as shown in FIG. 5. These and other similar variations on the principles and applications of the present invention are thus considered to be within the scope of the invention.

Figure 6:
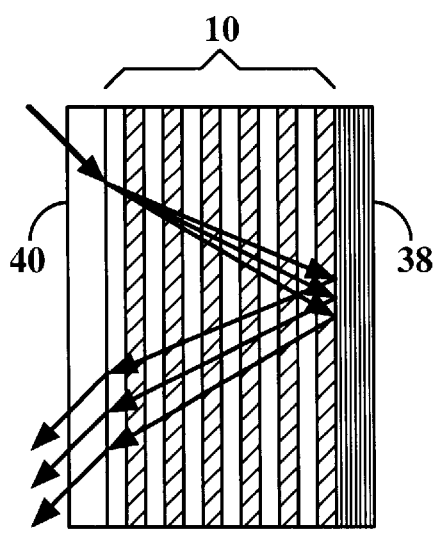
FIG. 6 shows a "single-bounce" embodiment of the invention, wherein a mirror reflects the beams again through the dielectric stack, producing additional separation between the wavelength components.
Figure 7:
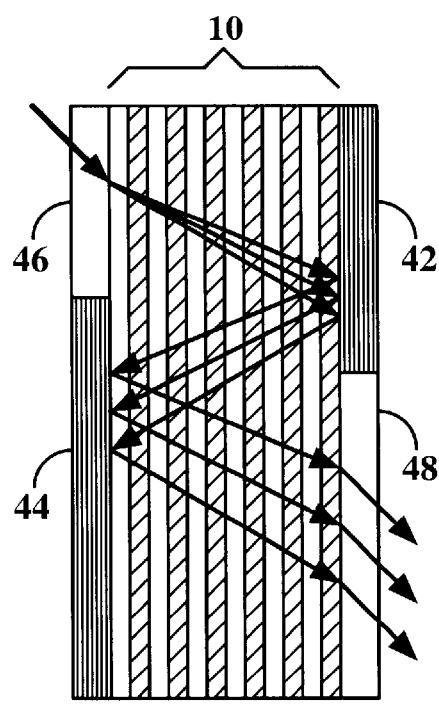
FIG. 7 shows a "double-bounce" embodiment of the invention, wherein two mirrors on opposite sides of the stack reflect the beams two additional times through the stack, producing additional separation between the beams.
Figure 8:
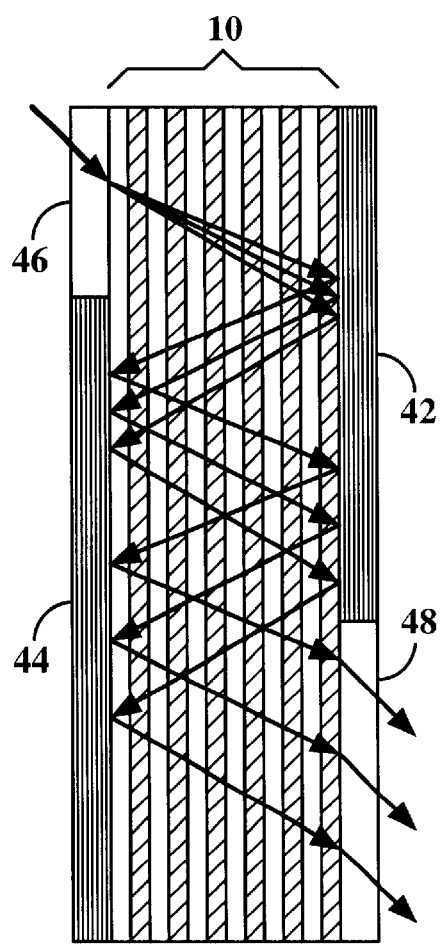
FIG. 8 illustrates how an alternate scaling of the dimensions of the device shown in FIG. 7 results in a "quadruple-bounce" embodiment of the invention.
Figure 9:
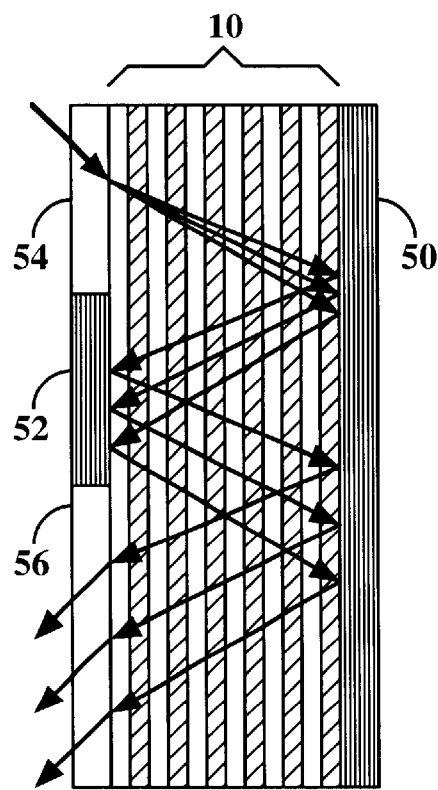
FIG. 9 shows a "triple-bounce" embodiment of the invention, wherein two mirrors on opposite sides of the stack reflect the beams three additional times through the stack, producing additional separation between the beams.
Figure 10A:
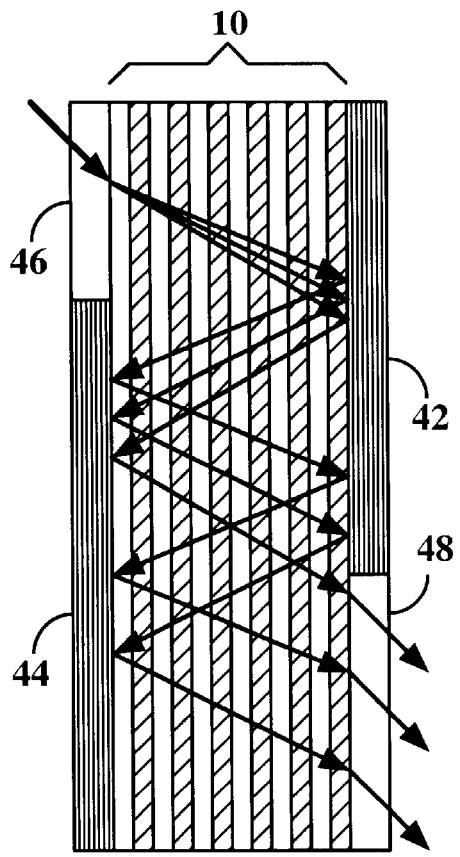
FIG. 10A illustrates how an alternate scaling of the dimensions of the device shown in FIG. 7 results in an embodiment of the invention where one wavelength component beam bounces twice, while the other beams bounce four times.
Figure 10B:
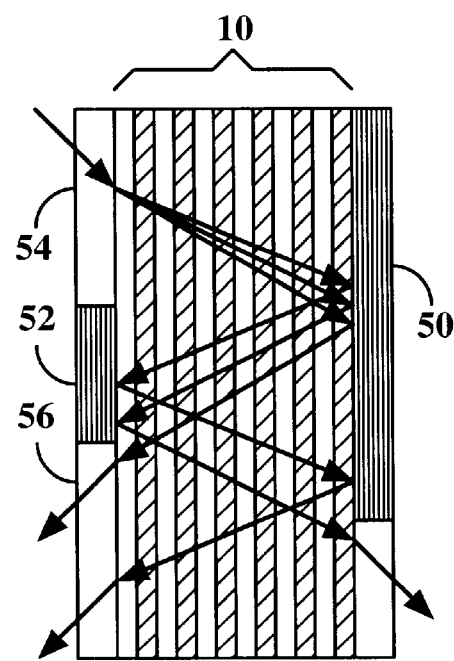
FIG. 10B shows an embodiment of the invention where a first beam bounces once, a second beam bounces twice, and a third beam bounces three times within the stack, producing various different amounts of beam separation. This embodiment also illustrates a case where the component beams do not all exit the same side of the device.

As shown in FIGS. 6–9, additional spatial separation of the beams can be obtained through the use of mirrors in conjunction with the dielectric stack, causing the beams to pass more than once through the stack. Reflection can also be used to reduce the thickness of the stack. FIG. 6 shows a simple "single-bounce" embodiment of the invention. A mirror 38 is fabricated on one side of the stack 10, so that the wavelength component beams are reflected once, passing back through the stack a second time, increasing their spatial separation. Preferably, the other side of the stack 10 is provided with an antireflective coating 40 that optimizes transmission into and out of the device by substantially eliminating back-reflections at the interface. Additional separation of the wavelength component beams can be obtained by additional reflections within the stack, as shown in FIGS. 7–9. A "double-bounce" embodiment of the invention is shown in FIG. 7. A first mirror 42 is fabricated on a part of one side of the stack 10, and a second mirror 44 is fabricated on a part of the other side of the stack 10. The mirrors are positioned so that the component beams are reflected twice, passing three times through the stack 10, producing even more spatial separation. Preferably, antireflective coatings 46 and 48 are fabricated on opposite sides of the stack where the light enters and exits the device. As shown in FIG. 8, an alternate scaling of the dimensions of the device shown in FIG. 7 produces a "quadruple-bounce" embodiment of the invention. Instead of bouncing off mirrors 42 and 44 just once, as they do in FIG. 7, the beams in FIG. 8 bounce twice off each mirror, resulting in twice the beam separation. A "triple-bounce" embodiment of the invention is shown in FIG. 9. This embodiment is designed so that the beams bounce twice off mirror 50, and once off mirror 52 on the opposite side of stack 10. Antireflective coatings 54 and 56 are positioned on the same side of stack 10 where the light enters and exits the device. It will be appreciated from these examples of "multiple-bounce" embodiments that any number of even bounces can be produced by appropriately scaling the embodiment shown in FIG. 8, and that any number of odd bounces can be produced by appropriately scaling the embodiment shown in FIG. 9. Accordingly, the scope of the invention is considered to include all "multi-bounce" configurations, regardless of the number of reflections. Moreover, as illustrated in FIG. 10A and 10B, devices can be designed so that the various wavelength component beams do not all experience the same number of bounces. FIG. 10A illustrates a case where one beam bounces twice, while the other beams bounce four times. FIG. 10B illustrates a case where a first beam bounces once, a second beam bounces twice, and a third beam bounces three times. Compared to the cases where all beams experience the same number of bounces, these configurations produce comparable beam separation in a slightly more compact size. Those skilled in the art will appreciate that various configurations of mirrors can be used to control the number of bounces of different wavelength component beams, as illustrated by these examples. Accordingly, such variations are considered within the scope of the present invention.

Figure 11:
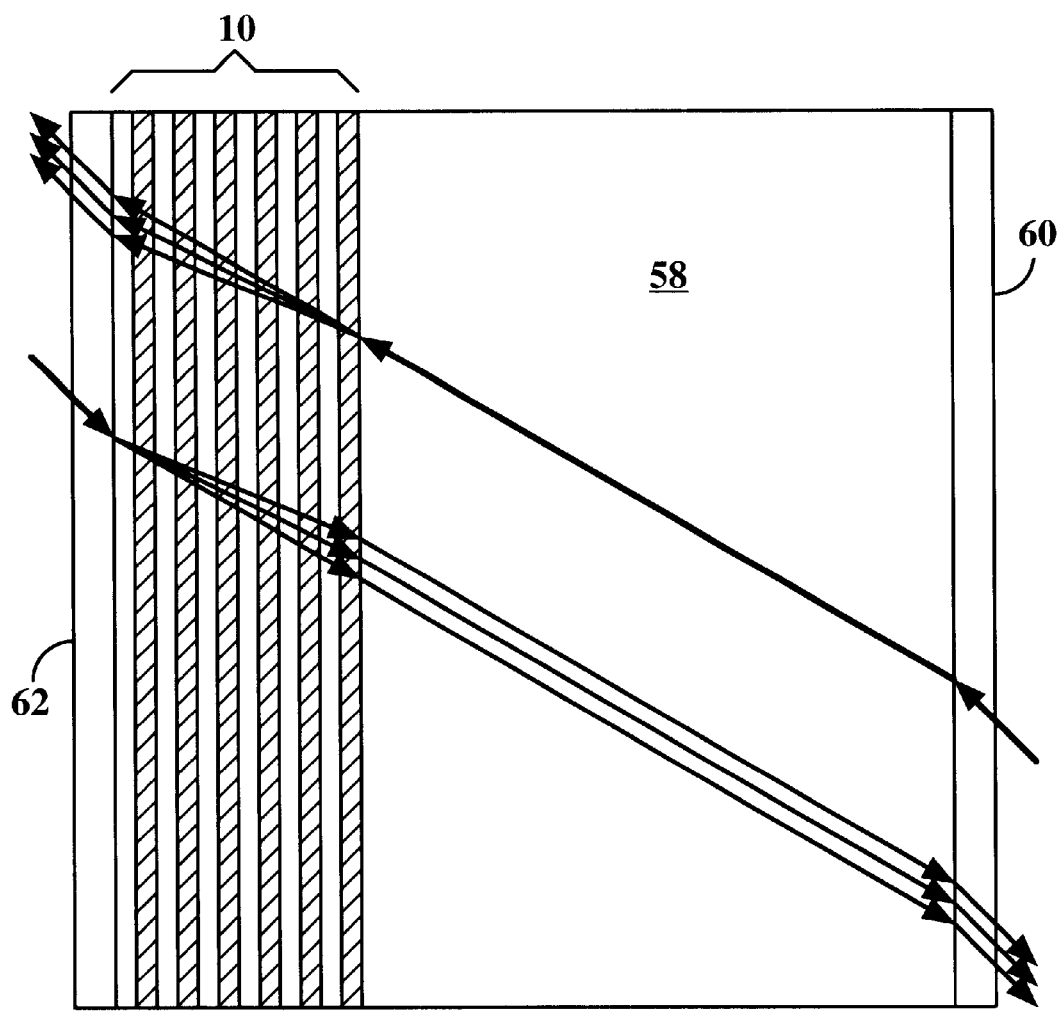
FIG. 11 shows an embodiment of the invention in which the stack is fabricated on a transparent substrate used as an optically functional part of the device.

The embodiments shown in FIGS. 6–10 may be made by fabricating the stack, mirror, and antireflective coating layers on a substrate using standard fabrication techniques. In the embodiments shown in FIGS. 6 and 9 where the light enters and leaves the same side of the device, the substrate may remain in place to provide mechanical support. In the embodiments shown in FIGS. 7, 8, 10A, and 10B, where the light exits the opposite side of the device it entered, a portion of the substrate may be removed, e.g., by etching techniques. In these cases, however, it may be advantageous and/or desirable to fabricate stack 10 on a transparent substrate 58, and to use the substrate as part of the device, as shown in FIG. 11. Preferably, antireflective coatings 60 and 62 are provided on both sides of the device to optimize transmission. As shown, the device may be used with light incident from either side, or both sides simultaneously. However, as will be discussed in more detail below in relation to FIG. 13, it is often preferable that the polychromatic beam initially enter the substrate rather than the stack, since the antireflective coating in this case is simpler, and the optical efficiency is greater.

Figure 12:
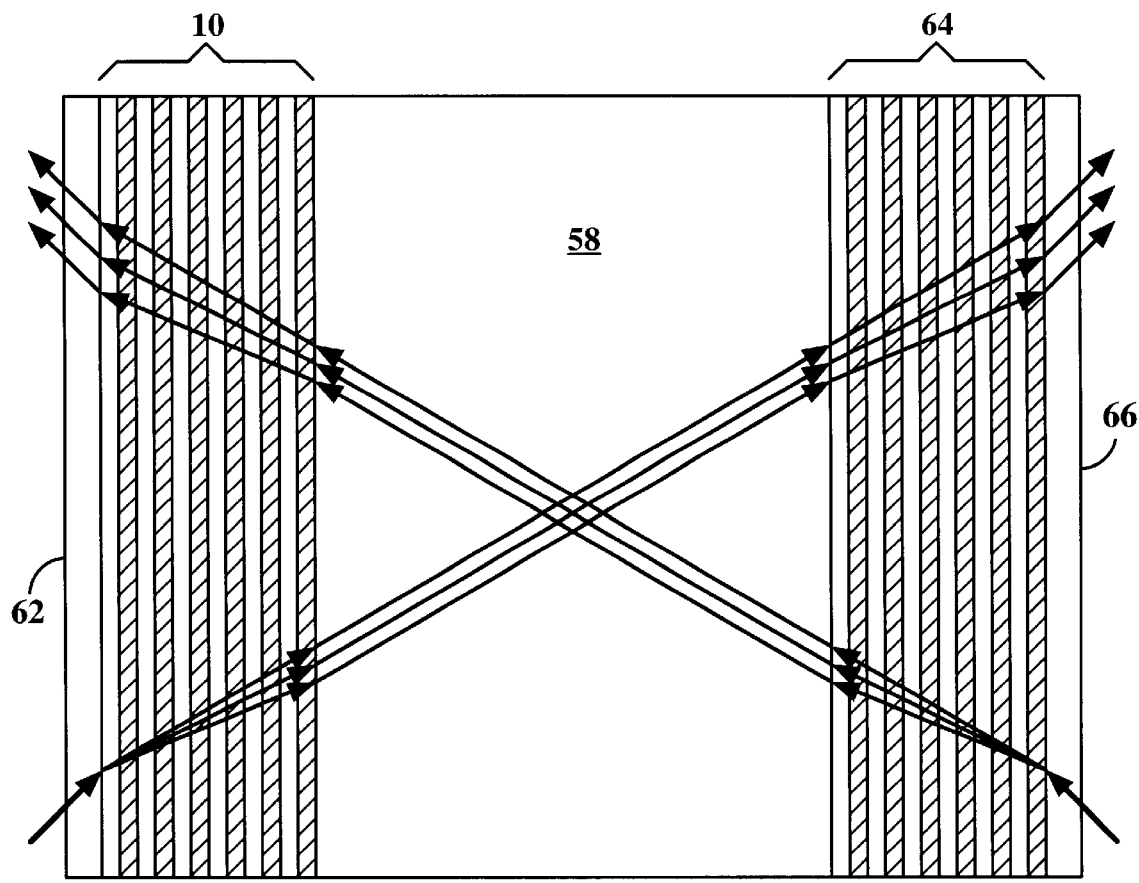
FIG. 12 shows an embodiment of the invention in which two dielectric stacks are fabricated on opposing sides of the substrate.
Figure 13:
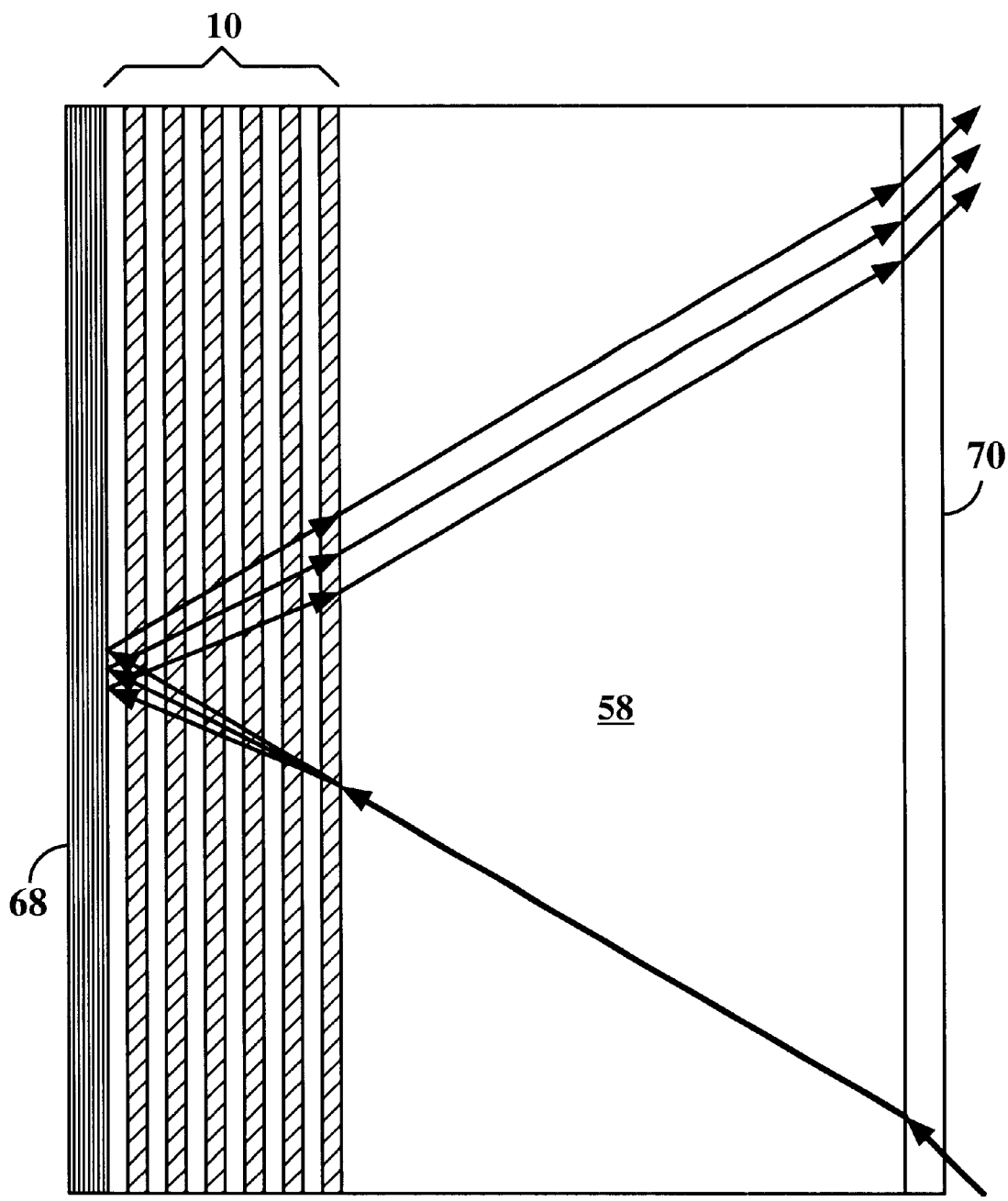
FIG. 13 shows a "multi-bounce" version of an embodiment of the invention that includes an optically functional substrate, wherein a mirror is used to reflect the beams again through the stack, producing additional beam separation.

Additional spatial separation of the component wavelength beams can be obtained by fabricating a second dielectric stack 64 on the other side of the substrate, as shown in FIG. 12. Preferably, an antireflective coating 66 is provided on second stack 64. As with all the embodiments described above, this embodiment can be used with light passing in either direction, or both directions simultaneously, as shown. Those skilled in the art will recognize that the stack-substrate combination shown in FIG. 11, as well as the stack-substrate-stack combination shown in FIG. 12, is functionally equivalent to a stack alone. Consequently, all the various "multi-bounce" embodiments discussed above in relation to FIGS. 6–11 apply also to the case where the stack 10 is replaced by a stack-substrate combination, or by a stack-substrate-stack combination. In particular, by fabricating one or more mirrors on one or both faces of a stack-substrate or stack-substrate-stack combination, a multi-bounce embodiment can be produced. To illustrate a simple example, FIG. 13 shows a "single-bounce" embodiment (like that shown in FIG. 6) with a stack 10 and substrate 58 combination. A mirror 68 is fabricated on stack 10, and an antireflective coating 70 is preferably fabricated on substrate 58. It should be noted that the embodiment shown in FIG. 13 has the advantage that light passes into and out of the device via the substrate 58, which has an effective and simple antireflective coating 70. In comparison, antireflective coatings designed to couple polychromatic light directly into stack 10 (e.g., those shown in FIGS. 6–11) are more complicated and typically less efficient.

Figure 14:
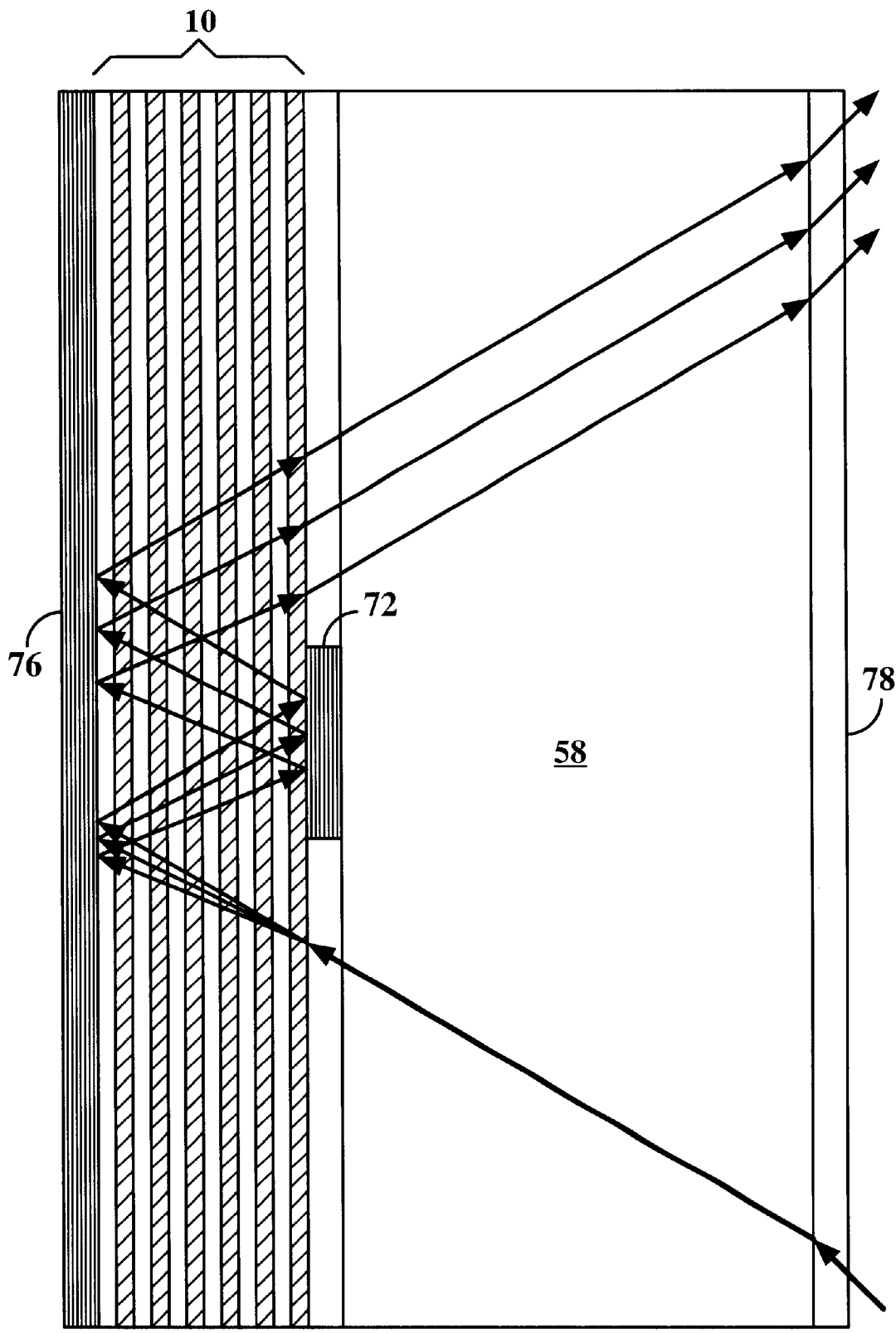
FIG. 14 shows a "triple-bounce" version of an embodiment of the invention that includes an optically functional substrate, wherein a mirror is fabricated at the interface between the stack and substrate.

Because the substrate adds depth to the device without providing additional dispersion of the wavelength components, it is advantageous in certain "multi-bounce" embodiments to fabricate mirrors between the substrate and stack so that the beams do not need to pass through the substrate between reflections. For example, FIG. 14 shows a "triple-bounce" embodiment where a mirror 72 is fabricated between stack 10 and substrate 58. A mirror 76 is fabricated on the other side of stack 10, and an antireflective coating 78 is fabricated on the opposite side of substrate 58, as shown. It will be noted that this embodiment, like that shown in FIG. 13, has the advantage that the beams enter and exit the device through the substrate, and not directly through the stack. Consequently, less efficient and more complicated antireflective coatings at the surface of the stack are not needed.

Figure 15:
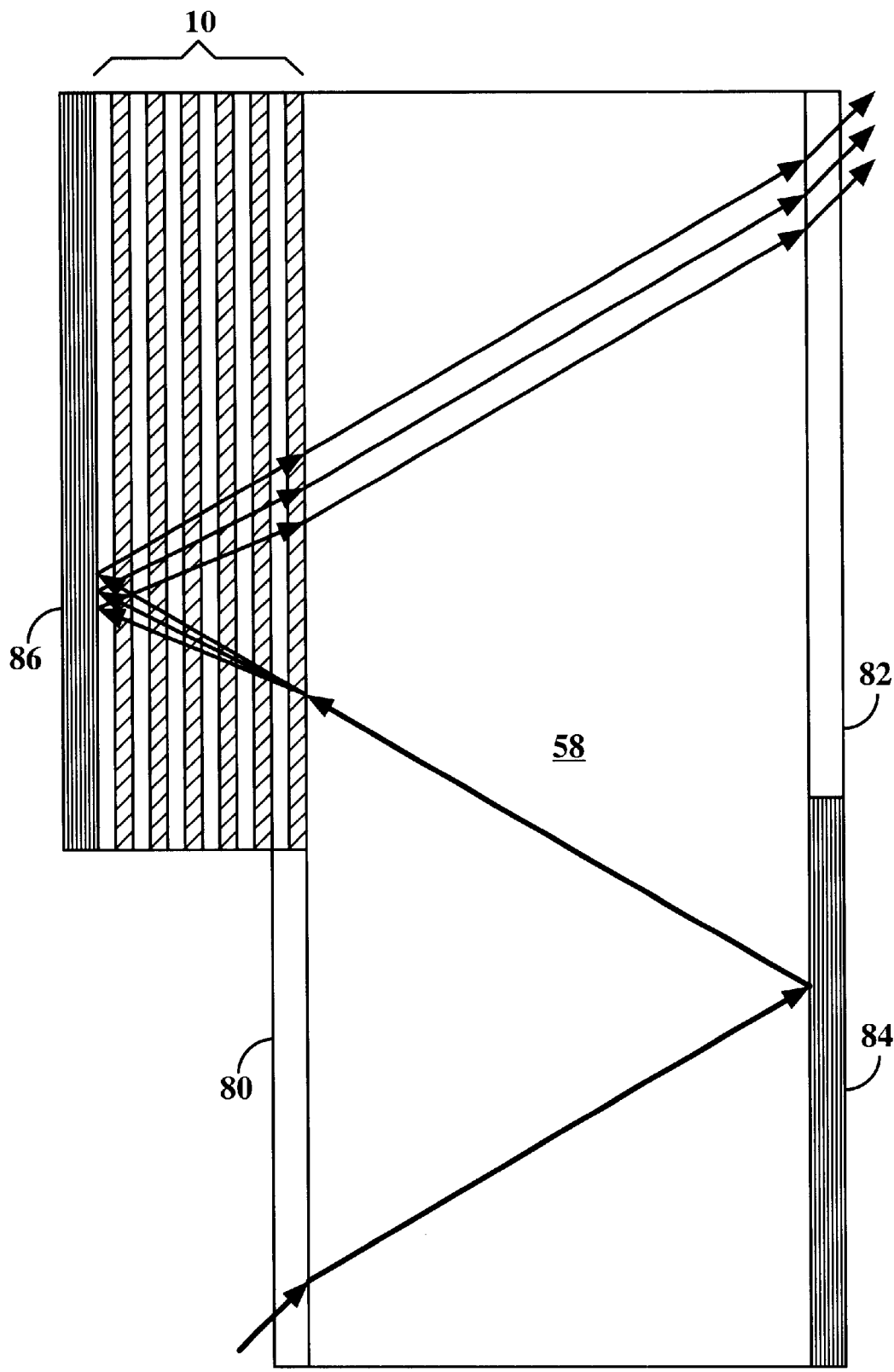
FIG. 15 shows an embodiment of the invention that allows light to exit the opposite side of the device that it entered without requiring that the light couple directly into or out of the stack.

It will be noted that the embodiments shown in FIGS. 13 and 14 require that light both enter and exit the same side of the device. In some cases, however, it may be desirable to have a device that allows light to exit the opposite side of the device that it entered. One way to accomplish this without requiring that the light couple directly into the stack is to leave a portion of the substrate bare (or etch it away). FIG. 15 shows an embodiment of the invention that illustrates this idea. Substrate 58 has stack 10 fabricated on only a portion of its surface. On the remaining bare portion is fabricated an antireflective coating 80. A similar coating is fabricated on the opposite side of substrate 58, as shown. Also fabricated on the opposite side of the substrate is a mirror 84 designed to reflect the beam entering through coating 80. Another mirror 86 is fabricated on the top of stack 10. This technique can be used in any multi-bounce embodiment to eliminate the need for complicated antireflective coatings at the surface of the stack.

Those skilled in the art will appreciate that the techniques illustrated in the above embodiments may be combined and extended in many straightforward ways to produce various other embodiments. Accordingly, such various embodiments are considered to be within the scope of the present invention.

It will also be appreciated by those skilled in the art that the devices of the present invention can be fabricated on the same substrate along with other semiconductor optical, electronic, or optoelectronic devices. Thus, various embodiments of the present invention may be included as a part of various complicated multi-component integrated devices.

It will be clear to one skilled in the art that the above embodiments may be altered in many ways without departing from the scope of the invention.

What is claimed is:

1. A solid-state optical wavelength division multiplexing-demultiplexing device comprising:

a) a multilayer dielectric stack having a main reflection region of substantially complete reflection;

b) a side in said multilayer dielectric stack for admitting a light within an operating range of wavelengths outside said main reflection region and within a predetermined range of angles of incidence, such that said multilayer dielectric stack exhibits a substantially nonzero angular group velocity dispersion to said light.

2. The device of claim 1, wherein said multilayer dielectric stack comprises alternating layers of a first dielectric material and a second dielectric material, said first dielectric material and said second dielectric material having distinct indices of refraction.

3. The device of claim 2, wherein said first dielectric material and said second dielectric material are selected such that said substantially nonzero group velocity dispersion is greater than 2 degrees per nanometer within 5 nm of an edge of said operating range of wavelengths.

4. The device of claim 2, wherein said alternating layers are non-periodic.

5. The device of claim 2, wherein said alternating layers comprise GaAlAs and Al oxide.

6. The device of claim 1, wherein said multilayer dielectric stack comprises a photonic crystal having a photonic crystal band gap and said operating range of wavelengths is outside said photonic crystal band gap.

7. The device of claim 1, further comprising an antireflective coating on said multilayer dielectric stack.

8. The device of claim 1, further comprising a mirror on said multilayer dielectric stack.

9. The device of claim 1, further comprising a substrate material having thereon said multilayer dielectric stack.

10. The device of claim 9, further comprising an antireflective coating on said substrate material.

11. The device of claim 9, wherein said substrate material is transparent to said light.

12. The device of claim 9, wherein said substrate material is GaAs.

13. The device of claim 9, further comprising a mirror on said substrate.

14. The device of claim 9, further comprising a mirror between said multilayer dielectric stack and said substrate.

15. A method for optical demultiplexing a polychromatic beam of light comprising an operating range of wavelengths into spatially separated wavelength component beams, said method comprising:

a) providing a multilayer dielectric stack having a main reflection region of substantially complete reflection, said operating range of wavelengths being outside said main reflection region;

b) providing a side in said multilayer dielectric stack for admitting said polychromatic beam of light;

c) coupling said polychromatic beam of light into said multilayer dielectric stack through said side within a predetermined range of angles of incidence, such that said multilayer dielectric stack demultiplexes said polychromatic beam of light in said spatially separated wavelength component beams by angular group velocity dispersion.

16. The method of claim 15, further comprising reflecting said polychromatic beam of light into said multilayer dielectric stack.

17. The method of claim 15, further comprising reflecting said spatially separated wavelength component beams into said multilayer dielectric stack.

18. The method of claim 15 employed in a wavelength division multiplex optical communication system.

* * * * *